US008544254B2

(12) United States Patent
Yamashita et al.

(10) Patent No.: US 8,544,254 B2
(45) Date of Patent: Oct. 1, 2013

(54) TURBINE GENERATOR SYSTEM

(75) Inventors: Seiji Yamashita, Kobe (JP); Daisuke Kariya, Kobe (JP); Hajime Shimizu, Kobe (JP); Naoki Miyake, Kobe (JP); Takeshi Okumura, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 518 days.

(21) Appl. No.: 12/859,598

(22) Filed: Aug. 19, 2010

(65) Prior Publication Data

US 2011/0047958 A1 Mar. 3, 2011

(30) Foreign Application Priority Data

Aug. 24, 2009 (JP) ................................ 2009-193694

(51) Int. Cl.
*F02C 7/06* (2006.01)

(52) U.S. Cl.
USPC ........................................ 60/39.08; 184/6.11

(58) Field of Classification Search
USPC ........................................ 60/39.08; 184/6.11
See application file for complete search history.

(56) References Cited

U.S. PATENT DOCUMENTS

| | | | | |
|---|---|---|---|---|
| 3,884,041 | A * | 5/1975 | Zerlauth | 60/657 |
| 4,105,093 | A * | 8/1978 | Dickinson | 184/6.11 |
| 5,881,564 | A * | 3/1999 | Kishimoto et al. | 62/193 |
| 6,279,340 | B1 * | 8/2001 | Butterworth et al. | 62/468 |
| 8,360,650 | B2 * | 1/2013 | Morales Espejel et al. | 384/473 |
| 2008/0139683 | A1 * | 6/2008 | Flynn et al. | 521/114 |

FOREIGN PATENT DOCUMENTS

| | | | |
|---|---|---|---|
| JP | 2004346824 | A * | 12/2004 |
| JP | A-2004-346843 | | 12/2004 |
| JP | A-2008-175212 | | 7/2008 |

* cited by examiner

*Primary Examiner* — Phutthiwat Wongwian
(74) *Attorney, Agent, or Firm* — Oliff & Berridge, PLC

(57) ABSTRACT

A turbine generator system includes a turbine power generation unit including a generator and a turbine for driving the generator. The turbine generator system also includes an evaporator, a condenser, a medium feeding pump, a circulating pump, and a feeding passage. The evaporator receives heat from a heat source and supplies a working medium in a vapor phase containing a lubricant to the turbine power generation unit. The condenser condenses the working medium which has flowed through the turbine. The medium feeding pump raises a pressure of the condensed working medium and feeds the working medium to the evaporator, and the working medium extracted from the evaporator is supplied through the feeding passage to bearings in the turbine power generation unit.

9 Claims, 5 Drawing Sheets

*Fig. 2*

TABLE OF COMPARISON OF FLUORINATED MEDIA

| TYPE OF MEDIA | CFC11 | HCFC123 | HFC245fa | HFE7000 | 3FE (TRIFLUOROETHANOL) |
|---|---|---|---|---|---|
| CHEMICAL FORMULA | $C(CL_3)F$ | $CH(CL_2)CF_3$ | $CHF_2CH_2CF_3$ | $C_3F_7OCH_3$ | $C_2F_3H_2OH$ |
| ENVIRONMENTAL FRIENDLINESS | × OZONE LAYER DEPLETION; YES (ODP=1) | × OZONE LAYER DEPLETION; YES (ODP=2) | △ OZONE LAYER DEPLETION; NO (ODP=0) WARMING POTENTIAL: SLIGHTLY HIGH (GWP=950) | ○ OZONE LAYER DEPLETION; NO (ODP=0) WARMING POTENTIAL: LOW (GWP=370) | ○ OZONE LAYER DEPLETION; NO (ODP=0) WARMING POTENTIAL: LOW (GWP=57) |
| HANDLEABILITY | ○ | × (TOXICITY) | × (TOXICITY) | ○ | △ (COMBUSTIBILITY) |
| BOILING POINT IN NORMAL PRESSURE | 24℃ | 28℃ | 15℃ | 34℃ | 74℃ |
| TOTAL EVALUATION | × | × | △ | ◎ | ○ |

◎ : VERY GOOD ○ : GOOD △ : AVERAGE × : BAD

ODP=OZONE DEPLETION POTENTIAL (MULTIPLYING FACTOR WHEN CFC11=1)

GWP= GLOBAL WARMING POTENTIAL (MULTIPLYING FACTOR WHEN CO2 = 1)

TURBINE GENERATOR SYSTEM

BACKGROUND OF THE INVENTION

1. Technical Field

The present invention relates to a turbine generator system capable of sufficiently lubricating bearings in a binary turbine utilizing waste heat.

2. Background Art

In recent years, a binary turbine generator system which uses as a heat source waste heat such as discharged hot water which has a temperature lower than 100 degrees C. and is generated in a large quantity in manufacturing processes in iron mills, ceramic engineering, etc, has attracted an attention, as a system intended to achieve energy saving and reduction of warming gases by using as a working medium, a medium with a low boiling point, other than water. In such a binary turbine generator system, in a case where the working medium itself has a lubricating ability, the working medium is supplied from a condenser to constituents to be lubricated, such as bearings in a turbine generator, to lubricate the bearings (see patent literature 1).

Patent Literature 1 Japanese Laid-Open Patent Application Publication No. 2008-175212

SUMMARY OF THE INVENTION

In the above mentioned binary turbine generator system, it is necessary to mix a lubricant into the working medium if the working medium does not have a lubricating ability. However, in a method in which the working medium is supplied from the condenser to the bearings like the technique disclosed in patent literature 1, the lubricant remains in the evaporator, because the working medium is easily evaporated in the evaporator but the lubricant is not easily evaporated therein. This results in a lowered lubricant concentration of the working medium in the condenser. In addition, because of a low pressure of the working medium, the lubricated state of the bearings becomes degraded. If a large quantity of lubricant is mixed into the working medium to improve the lubricated state of the bearings in the turbine generator, heat transmissibility of the evaporator and the condenser is impeded, which is undesirable.

An object of the present invention is to provide a turbine generator system capable of sufficiently lubricating constituents to be lubricated in the turbine generator without impeding heat transmissibility of the evaporator and the condenser.

To achieve the above object, a turbine generator system of the present invention comprises a turbine power generation unit including a generator and a turbine for driving the generator; a working medium including a lubricant and causing the turbine power generation unit to operate; an evaporator which evaporates the working medium by heat exchange with a heat source and supplies the evaporated working medium to the turbine power generation unit; a condenser which liquefies the working medium which has flowed through the turbine; a medium feeding pump which raises a pressure of the liquefied working medium and feeds the liquefied working medium to the evaporator; and a feeding passage through which the working medium in a liquid phase extracted from the evaporator is supplied to a constituent to be lubricated in the turbine power generation unit.

In accordance with the above configuration of the turbine generator system, the working medium converted into a vapor phase in the evaporator is supplied to the turbine power generation unit, while the lubricant is not easily evaporated, and therefore the working medium in a liquid phase with a high lubricant concentration remains at the lower portion of the evaporator. Since the working medium in a liquid phase with a high lubricant concentration is supplied from the evaporator having a high pressure to the constituent to be lubricated in the turbine power generation unit through the feeding passage, the constituent to be lubricated can be sufficiently lubricated. Therefore, it is not necessary to mix a large quantity of lubricant into the working medium for the purpose of enhancing its lubricating ability, and as a result, heat transmissibility of the evaporator and the condenser is not impeded.

The turbine generator system preferably further comprises a return passage through which the working medium discharged from the constituent to be lubricated is returned to the condenser. In accordance with this configuration, the working medium is not released to outside and therefore, does not negatively affect surrounding environment. Thus, the working medium can be circulated and utilized within a closed system.

The turbine generator system may further comprise a circulating pump which takes out the working medium from a lower portion of the evaporator and injects the working medium into an inside of the evaporator through an injection port provided at an upper portion of the evaporator. The feeding passage may branch at an outlet of the circulating pump and serve to feed the working medium to the constituent to be lubricated. In accordance with this configuration, the circulating pump normally feeds the working medium with a constant flow rate unlike a medium feeding pump which varies the flow rate of the working medium according to the output of the system. Therefore, the working medium with a high lubricant concentration can be supplied to the constituent to be lubricated with an invariable quantity through the feeding passage which branches at the outlet of the circulating pump.

The turbine generator system preferably comprises a depressurizing device provided on the feeding passage, for evaporating a part of the working medium by depressurization. In accordance with this configuration, the lubricant concentration in the working medium increases due to the evaporation in the evaporator and the temperature of the lubricant decreases due to latent heat of the evaporation, thereby resulting in increased viscosity. Therefore, a high lubricating capability can be maintained, and cooling of the constituent to be lubricated is facilitated.

The turbine generator system preferably comprises a cooler provided on the feeding passage, for cooling the working medium. By providing the cooler on the feeding passage, the temperature of the working medium within the feeding passage can be decreased, the lubricating capability can be improved due to increased viscosity of the lubricant, and cooling is facilitated.

In the turbine generator system, a bottom surface of the evaporator is preferably disposed above an inlet through which the working medium is fed to the constituent to be lubricated. In accordance with this configuration, since the evaporator has a high pressure and the bottom surface of the evaporator is disposed above the inlet through which the working medium is fed to the constituent to be lubricated, the working medium can be stably supplied to the inlet through which the working medium is fed to the constituent to be lubricated, without using a pump.

In the turbine generator system, the lubricant preferably has compatibility with a main medium. Thus, since the main medium and the lubricant in the working medium are not separated from each other in a liquid phase inside the evaporator, the working medium with a constant lubricant concentration can be taken out from a desired portion of the liquid phase of the evaporator.

In the turbine generator system, the working medium is preferably a mixture of HFE (hydrofluoroether) and a lubricant composed of fluorinated oil. HFE is an excellent working medium which has a low global warming potential and will not deplete an ozone layer, but has no lubricating ability. Accordingly, the lubricant composed of the fluorinated oil is mixed into the HFE to enable the working medium to have a lubricating ability. In addition, the HFE and the lubricant composed of the fluorinated oil have high compatibility.

In the above turbine generator system, preferably, the constituent to be lubricated is, for example, a bearing in the turbine power generation unit, and the turbine generator system comprises an oil container which reserves the supplied working medium in the liquid phase to immerse a lower portion of the bearing in the working medium. In this configuration, since the bearing rotates in a state where its lower portion is immersed in the working medium in the oil container, the entire bearing is sufficiently lubricated.

In the above turbine generator system, preferably, the constituent to be lubricated is, for example, a bearing in the turbine power generation unit, and the turbine generator system comprises an injection unit for injecting the supplied working medium in the liquid phase to the bearing. In this a configuration, since the working medium in the liquid phase is forcibly injected in a large quantity under a pressurized state from the injection unit to the bearing, the bearing can be lubricated and cooled effectively even for a case where high-speed rotation is necessary and a heat generation amount of the bearing is great.

In accordance with the above described present invention, the working medium converted into a vapor phase in the evaporator having a high pressure is supplied to the turbine power generation unit, while the lubricant is not easily evaporated, and therefore the working medium in a liquid phase with a high lubricant concentration remains at the lower portion of the evaporator. Since the working medium in a liquid phase with a high lubricant concentration is supplied from the evaporator having a high pressure to the constituent to be lubricated in the turbine power generation unit through the feeding passage, the constituent to be lubricated can be sufficiently lubricated. Therefore, it is not necessary to mix a large quantity of lubricant into the working medium for the purpose of enhancing its lubricating ability, and as a result, heat transmissibility of the evaporator and the condenser is not impeded.

BRIEF DESCRIPTION OF THE DRAWINGS

FIG. 2 is a table showing comparison of properties of a medium used in the present invention and other media.

DESCRIPTION OF THE PREFERRED EMBODIMENTS

Hereinafter, preferred embodiments of the present invention will be described in detail with reference to the drawings.

The First Embodiment

Figure 1:
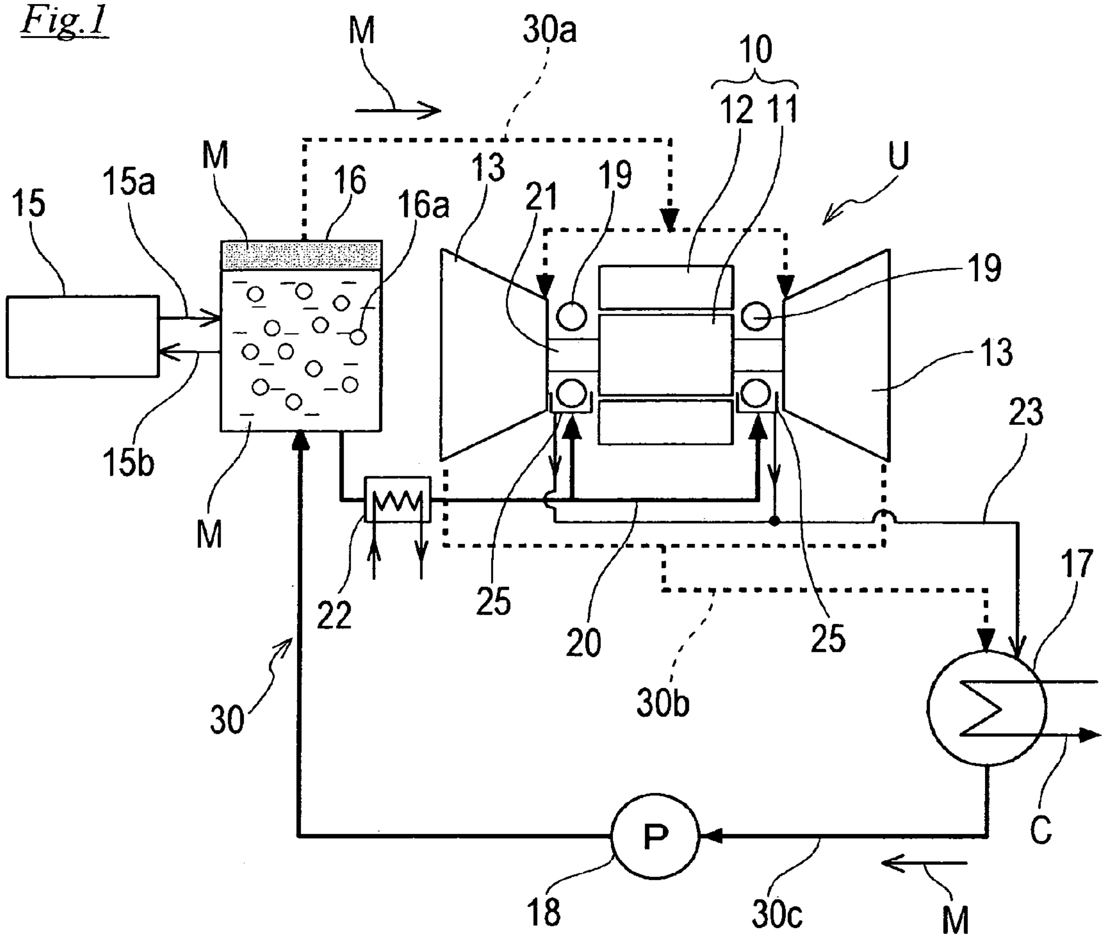
FIG. 1 is a schematic view showing a configuration of a turbine generator system according to Embodiment 1 of the present invention.

Referring to FIG. 1, a turbine generator system according to Embodiment 1 of the present invention comprises a turbine power generation unit U including a generator 10 and turbines 13 for driving the generator 10. On a medium passage 30 through which a working medium M for the turbines 13 is circulated, an evaporator 16 of a full liquid type, a condenser 17 and a medium feeding pump 18 are provided. The evaporator 16 is configured to receive heat from a heat source 15 by heat exchange to evaporate the working medium M and supplies the working medium M in a vapor phase to the turbine power generation unit U via a vapor phase medium feeding passage 30*a*. After rotating the turbines 13 in the turbine power generation unit U, the working medium M is fed to the condenser 17 via a vapor phase medium recovery passage 30*b*. The working medium M is liquefied in the condenser 17, and supplied to the evaporator 16 after its pressure is raised by the medium feeding pump 18 attached to a liquid phase medium feeding passage 30*c* while flowing through the liquid phase medium feeding passage 30*c*. The medium passage 30 which is a circulating passage includes the vapor phase medium feeding passage 30*a*, the vapor phase medium recovery passage 30*b* and the liquid phase medium feeding passage 30*c*.

The generator 10 includes a generator rotor 11 and a generator stator 12. The turbines 13, 13 are disposed at both ends of the generator rotor 11 and the generator stator 12. The generator rotor 11 is coupled to the turbines 13, 13 by means of a single rotary shaft 21. The rotary shaft 21 is rotatably supported by two bearings 19 arranged between the generator 10 and the two turbines 13, 13. The two turbines 13, 13 are disposed to face in different directions and have a mirror-image form, which allows an axial thrust applied to the turbines 13, 13 to be cancelled. Thus, thrust bearings are omitted or simplified. Therefore, the bearings 19 mainly receive a radial load applied by the rotary shaft 21.

The working medium M is a mixture of a lubricant and a main medium with a low boiling point, as described later. A part of the working medium M is used to cool the bearings 19 which are one constituents to be lubricated in the turbine power generation unit U.

The heat source 15 is, for example, waste heat such as hot water which is generated in a large quantity in manufacturing processes in iron mills, ceramic engineering, etc. The hot water which has been derived from the heat source 15 is introduced into heat transmission pipes 16*a* inside the evaporator 16 through a heating medium feeding passage 15*a* and thereafter is returned from the heat transmission pipes 16*a* to the heat source 15 side through a heating fluid recovery passage 15*b*.

The condenser 17 has a known structure, containing a pipe of a cooling medium C inserted into the interior thereof. The condenser 17 is configured to cool the working medium M in a vapor phase using the cooling medium C, after the working medium M has rotated the turbines 13.

Below each bearing 19, an oil container 25 is provided. The oil container 25 is coupled to the lower portion of the evaporator 16 by means of a feeding passage 20. Although in Embodiment 1, a cooler 22 is provided on the feeding passage

20 to cool the working medium M in a liquid phase which is supplied to the bearings 19, the cooler 22 may be omitted.

Each bearing 19 is coupled to the condenser 17, to be more specific, each oil container 25 is coupled to the inlet of the condenser 17, by means of a return passage 23 used for returning the working medium M in a liquid phase discharged from the bearing 19, to the condenser 17. The working medium M in a liquid phase is returned to the condenser 17 through the return passage 23 and joined to the working medium M which has been fed through the vapor phase medium recovery passage 30*b*, in the interior of the condenser 17.

As shown, the bottom surface of the evaporator 16 is disposed above the inlet through which the working medium M is fed to the bearing 19, i.e., the inlet through which the working medium M flows into the oil container 25. Since the evaporator 16 has a higher pressure than a normal pressure and the bottom surface of the evaporator 16 is disposed above the inlet through which the working medium M is fed to the bearing 19, the working medium M can be stably supplied from the evaporator 16 to the inlet through which the working medium M is fed to the bearing 19, without using a pump. Alternatively, the bottom surface of the evaporator 16 need not be disposed above the inlet through which the working medium M is fed to the bearing 19, and the working medium M can be supplied to the bearing 19 having a normal pressure, by the pressure of the evaporator 16.

As the main medium of the working medium used in the turbine generator system, there are HFE (hydrofluoroether), i.e., substances which are obtained by substituting a part of H with F in a general expression $C_nH_{2n+1}$—O—$C_mH_{2m+1}$, have boiling points higher than 25 degrees C. and lower than 100 degrees C. in a normal pressure, and contain carbons C which are not more than seven in number, for example, $C_3F_7OCH_3$ (HFE7000), $C_4F_9OCH_3$ (HFE7100), $C_4F_9OC_2H_5$ (HFE7200), $C_6F_{13}OCH_3$ (HFE7300) and $CHF_2$—$CF_2$—O—$CH_2$—$CF_3$ (HFE-S7). Among these, a specific example of $C_3F_7OCH_3$ is available from 3M under the trade name of Novec 7000. As other alternative media, there are HFC (hydrofluorocarbon) obtained by substituting a part of H with F in $C_nH_{2n+2}$, FE (fluoroether) obtained by substituting all of H with F in a general expression $C_nH_{2n+1}$—O—$C_mH_{2m+1}$, and fluorinated alcohol obtained by substituting a part of H other than OH with F in $C_nH_{2n+1}$—OH.

Hereinafter, the reason why the medium represented by the above mentioned HFE (hydrofluoroether) is suitable for use as the main medium in the turbine generator system will be explained with reference to the table showing comparison of properties of the media shown in FIG. 2. FIG. 2 exemplarily shows CFC (chlorofluorocarbon), HCFC (hydrochlorofluorocarbon), HFC (hydrofluorocarbon), and one kind of HFE which has a boiling point of about a room temperature (15~30 degrees C.) in a normal pressure. FIG. 2 also shows 3FE (trifluoroethanol: $C_2F_3H_2OH$) as one kind of the fluorinated alcohol. As can be clearly seen from the table showing property comparison, medium name HFE7000 (chemical formula: $C_3F_7OCH_3$) is decomposed in the atmosphere because of the presence of oxygen O in an ether compound, will not deplete an ozone layer because of ozone depletion potential ODP=0, has a low global warming potential GWP=370, has excellent environmental friendliness, and has no toxicity. 3FE has excellent properties except for its low combustibility, and therefore may satisfactorily be used as the main medium. On the other hand, CFC, HCFC, and HFC are inferior in environmental friendliness and toxicity. Nonetheless, HFC which is excellent in ozone depletion potential, may also be used as the main medium. As other medium having excellent environmental friendliness, like HFE, there is HFO (hydrofluoroolefin), for example, HFO-1234yf ($CF_3CF$═$CH_2$), which may also be used as the main medium.

As the lubricant mixed into the main medium, fluorinated oil expressed as the following chemical formulae, having a polymerized structure in which base oil of the lubricant or additive is partially or all terminated by fluorine.

(Chemical formula 1)

$$F\text{—}\left(\underset{\substack{|\\ CF_3}}{CF}\text{—}CF_2\text{—}O\right)_n\text{—}CF_2\text{—}CF_3 \quad \text{or}$$

(n = 7-60)

(Chemical formula 2)

$$\text{—}\left(CF_2\text{—}CF_2\right)_n\text{—}.$$

The fluorinated oil expressed as the chemical formula I is, for example, available from Dupont under the trade name of Krytox. This fluorinated oil is highly compatible with the main medium such as the above HFE. In a liquid phase state, the main medium and the fluorinated oil are not separated from each other.

As described above, in the present invention, the working medium M which is a mixture of the main medium such as HFE and the fluorinated oil as the lubricant is used. This HFE is an excellent medium which has a low global warming potential and will not deplete the ozone layer, but has no lubricating ability. Accordingly, the lubricant composed of the fluorinated oil is mixed into the HFE to enable the working medium M to have a lubricating ability.

The operation of the turbine generator system configured as described above will be described with reference to FIG. 1. The hot water which has been derived from the heat source 15 is introduced into the evaporator 16 via the heating medium feeding passage 15*a*, and the working medium M inside the evaporator 16 is evaporated into a high-pressure vapor phase of about 1.4 atmospheric pressure, by heat exchange with the introduced hot water, in other words, by receiving the heat from the heat source 15. On the other hand, the lubricant is not easily evaporated, and therefore remains at the lower portion of the evaporator 16, as the working medium M in a liquid phase with a high lubricant concentration.

The working medium M converted into a vapor phase is taken out from the upper portion of the evaporator 16 and supplied to the pair of turbines 13, 13 in the turbine power generation unit U through the vapor phase medium feeding passage 30*a*. The working medium M drives both of the turbines 13, 13. Thereupon, the generator 10 coupled to the turbines 13 by means of the rotary shaft 21 is driven to generate electric power. The working medium M, which has released energy in the turbines 13, flows into the condenser 17 through the vapor phase medium recovery passage 30*b* and is cooled and liquefied by heat exchange with the cooling medium C. The working medium M converted into a liquid phase, is raised in pressure by the medium feeding pump 18 while flowing through the liquid phase medium feeding passage 30*c*, and returned to the evaporator 16.

On the other hand, the working medium M in a liquid phase with a high lubricant concentration, which remains at the lower portion of the evaporator 16, is supplied to the oil containers 25 of the bearings 19 which are the constituents to be lubricated in the turbine power generation unit U, through the feeding passage 20. In this case, the working medium M is cooled by the cooler 22 provided on the feeding passage 20. This makes it possible to lower the temperature of the working medium M and improve its property including the viscosity of the lubricant. The working medium M in a liquid phase which has been supplied to the oil containers 25 is a working medium containing a large quantity of lubricant and having a high lubricant concentration. During the rotation of the turbine generator, the bearings 19 are sufficiently lubricated all the time by the working medium M having a high lubricant concentration. Since the bearings 19 rotate in a state where their lower portions are immersed in the working medium M in the oil containers 25, the working medium M is supplied to the entire bearings 19 and lubricate them. In this way, since the bearings 19 can be lubricated by the working medium M with a high lubricant concentration, it is not necessary to mix a large quantity of lubricant into the working medium to enhance lubricating ability. As a result, heat transmissibility of the evaporator 16 and the condenser 17 is not impeded.

It is sufficient that the working medium M with a quantity required to lubricate the bearings 19 is be reserved in the oil containers 25, and a surplus working medium is discharged from the oil containers 25 to the return passage 23 and returned to the condenser 17 through the return passage 23. Therefore, the working medium M is circulated and utilized in a closed system, without being discharged to outside the system and negatively affecting surrounding environment. In some cases, a part of the working medium M is converted into a vapor phase, due to temperature rise in the bearings 19. In those cases, the working medium M containing a mixture of a liquid phase and a vapor phase enters the condenser 17 through the return passage 23. Since the inlet of the condenser 17 is in about a normal pressure state, the working medium M is smoothly recovered from the oil containers 25 in a slightly high-pressure state, to the condenser 17. Alternatively, the downstream end of the return passage 23 may be coupled to the vapor phase medium recovery passage 30*b* instead of the inlet of the condenser 17.

The Second Embodiment

Figure 3:
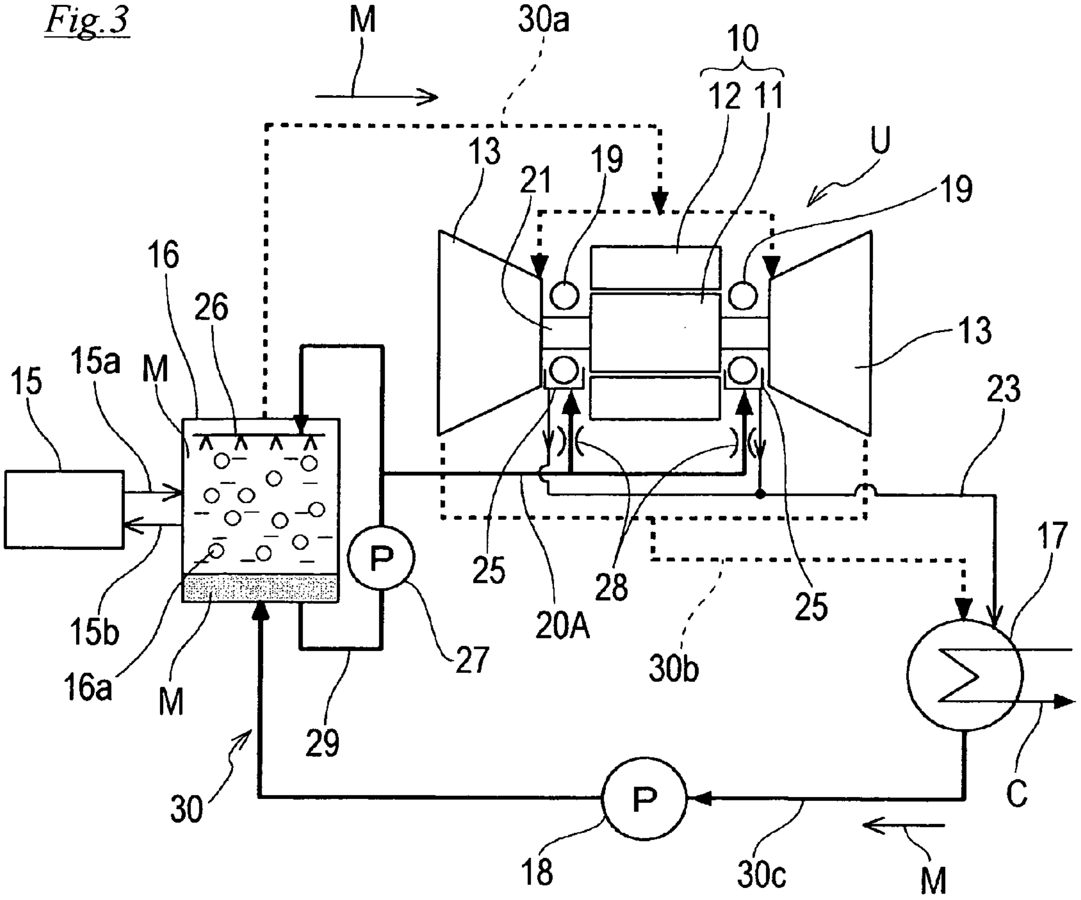
FIG. 3 is a schematic view showing a configuration of a turbine generator system according to Embodiment 2 of the present invention.

FIG. 3 shows a turbine generator system according to Embodiment 2 of the present invention. In Embodiment 2, the same constituents as those of Embodiment 1 shown in FIG. 1 are designated by the same reference characters and will not be described repetitively in detail. Although in Embodiment 1, the evaporator 16 of a full liquid type is used as shown in FIG. 1, an evaporator 16 of a falling liquid film type is used in Embodiment 2 as shown in FIG. 3. The evaporator 16 of a falling liquid film type is configured in such a manner that a circulating pump 27 provided on a circulating passage 29 disposed for allowing communication between the lower portion and the upper portion of the evaporator 16 causes the working medium M in a liquid phase to be taken out from the lower portion of the evaporator 16 and to be showered to the heat transmission pipes 16*a* inside the evaporator 16 through an injection port of an injection pipe 26 disposed at the upper portion inside the evaporator 16, thus facilitating heat exchange.

A feeding passage 20A branches at the outlet of the circulating pump 27 and serves to feed the working medium M in a liquid phase to the oil containers 25 of the bearings 19. Therefore, the working medium M having a higher pressure than the working medium M used in Embodiment 1 is supplied to the bearings 19, which are lubricated more smoothly. The feeding passage 20A is provided with depressurizing devices 28 including throttles such as orifices or pressure reducing valves. The depressurizing device 28 is configured to evaporates a part of the working medium M in a liquid phase by depressurization, thereby increasing a lubricant concentration and decreasing the temperature of the working medium M due to latent heat of the evaporation.

The operation of Embodiment 2, which is identical to that of Embodiment 1, will not be described repetitively, and only a different operation will be described. In Embodiment 1, since the medium feeding pump 18 varies the flow rate of the working medium M such that a liquid level in the evaporator 16 is kept constant, and thus the pressure inside the evaporator 16 is varied, the amount of the working medium M supplied to the bearings 19 is varied. On the other hand, Embodiment 2 has an advantage that since the circulating pump 27 is operated to feed the working medium M with a constant flow rate, the working medium M in a liquid phase with a high lubricant concentration can be supplied to the bearings 19 with an invariable amount through the feeding passage 20A which branches at the outlet of the circulating pump 27.

In Embodiment 2, in addition, the pressurizing device 28 provided on the feeding passage 20A evaporates a part of the working medium M, thereby increasing the lubricant concentration of the working medium M and decreasing the temperature of the working medium M due to latent heat of the evaporation, which results in increased viscosity of the lubricant in the working medium M. As a result, a high lubricating capability is maintained.

The feeding passage 20A of Embodiment 2 may be provided with the cooler 22 in Embodiment 1, instead of or in addition to the depressurizing device 28. In the same manner, the depressurizing device 28 in Embodiment 2 is applicable to Embodiment 1.

The Third Embodiment

Figure 4:
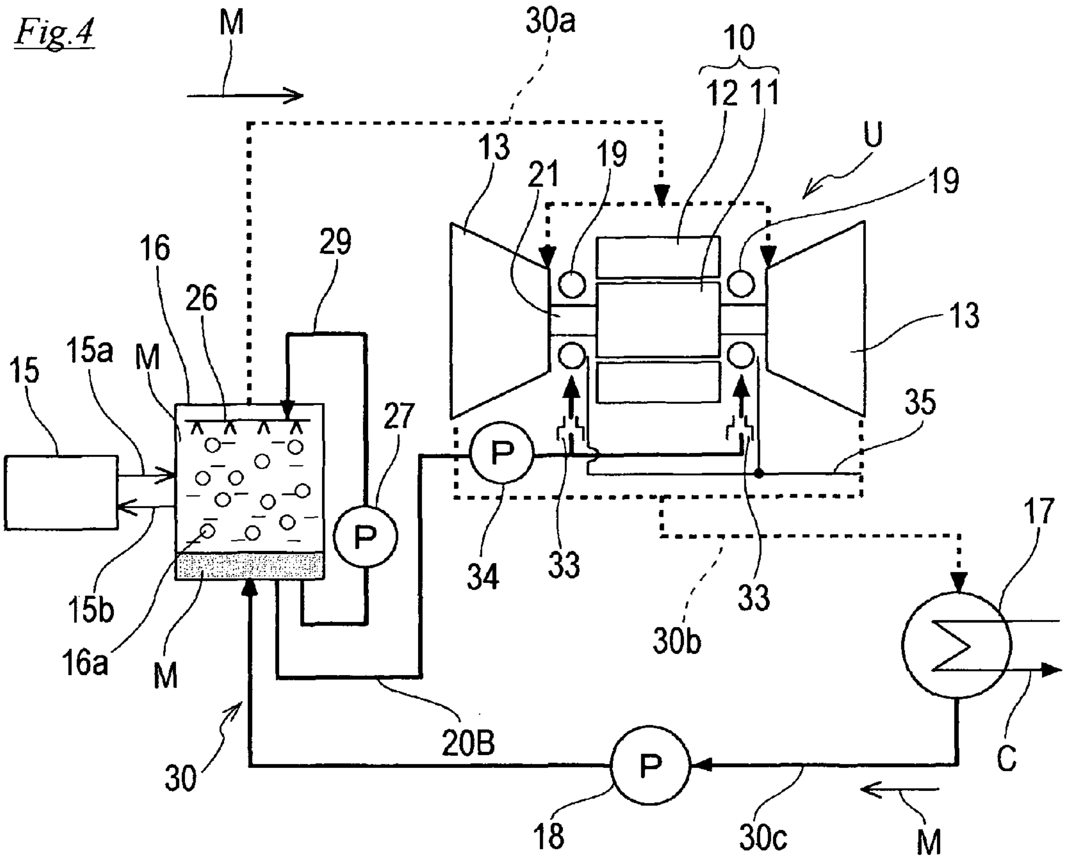
FIG. 4 is a schematic view showing a configuration of a turbine generator system according to Embodiment 3 of the present invention.

FIG. 4 shows a turbine generator system according to Embodiment 3 of the present invention. Embodiment 3 uses the evaporator 16 of a falling liquid film type, similarly to Embodiment 2. In FIG. 4, the same constituents as those of Embodiment 2 shown in FIG. 3 are designated by the same reference characters and will not be described repetitively in detail, but only different constituents will be described.

In Embodiment 2 shown in FIG. 3, the working medium M in a liquid phase is supplied to the bearings 19 through the feeding passage 20A which branches at the outlet of the circulating pump 27 provided on the circulating passage 29 for allowing communication between the upper portion and the lower portion of the evaporator 16. On the other hand, in Embodiment 3 shown in FIG. 4, each bearings 19 is provided with an injection unit 33 for injecting the working medium M in a liquid phase to the bearing 19, the lower portion of the evaporator 16 is coupled to the injection unit 33 by means of a feeding passage 20B, and an injection pump 34 is provided on the feeding passage 20B to feed the working medium M in a liquid phase to the injection unit 33 under a pressurized state. A return passage 35 couples the bearing 19 to the vapor phase medium recovery passage 30*b* to recover the working medium M in a liquid phase discharged from the bearing 19 during the lubrication.

Figure 5:
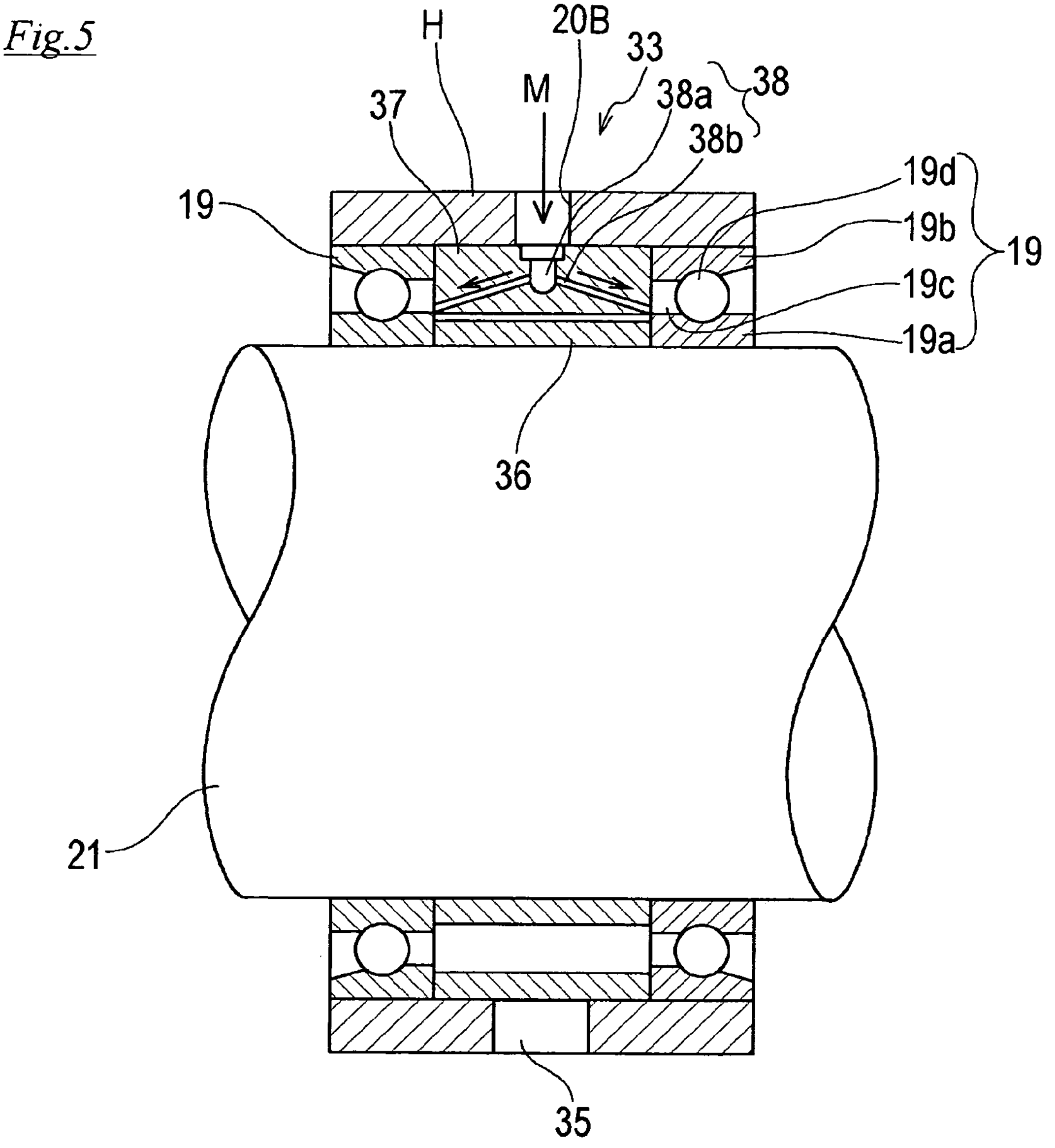
FIG. 5 is a cross-sectional view showing a detailed structure of an injection unit of FIG. 4.

FIG. 5 shows a detailed structure of the injection unit 33. As shown in FIG. 5, an inner ring spacer 36 secured to the rotary shaft 21 and an outer ring spacer 37 secured to a housing H are disposed between the pair of right and left bearings 19, 19, and an injection nozzle 38 is provided in the outer ring spacer 37. The injection nozzle 38 includes an inflow port 38*a* at the center and injection passages 38*b* which branch at the inflow port 38*a* and extend toward the pair of right and left bearings 19, 19. The tip end of the injection passage 38*b* opens in a bearing space 19*d* between an inner ring 19*a* and an outer ring 19*b* of the bearing 19. Through the bearing space 19*c*, the working medium M in a liquid phase is injected from the injection passage 38*b* to a rollable element 19*d*. The housing H is formed with a downstream portion of the feeding passage 20B through which the working medium M in a liquid phase is supplied to the injection unit 33, and an upstream portion of the return passage 35 for the working medium M. One or two injection nozzles 38 is/are provided for respective of the bearings 19, 19.

In Embodiment 3, as shown in FIG. 4, the working medium M in a liquid phase is taken out from the lower portion of the evaporator 16, flows through the feeding passage 20B, and is injected from the injection unit 33 as a high-speed jet to lubricate the bearings 19, 19. Therefore, the bearings 19 can be lubricated and cooled effectively even for a case where a high-speed rotation is necessary and a heat generation amount of the bearings is great.

Although the preferred embodiments have been described above with reference to the drawings, various alternations and modification are easily made by persons skilled in the art within an obvious scope of the invention with reference to the present specification. Therefore, such alternations and modifications are to be construed as those within a scope of the invention defined by the attained claims.

REFERENCE SIGNS LIST

C cooling medium
M working medium
U turbine power generation unit
10 generator
13 turbine
15 heat source
16 evaporator
16*a* heat transmission pipe
17 condenser
18 medium feeding pump
19 bearing
20, 20A, 20B feeding passage
22 cooler
26 injection pipe
27 circulating pump
28 depressurizing device
29 circulating passage
30 medium passage
30*a* vapor phase medium feeding passage
30*b* vapor phase medium recovery passage
30*c* liquid phase medium feeding passage
33 injection unit
34 injection pump
35 return passage
38 injection nozzle
38*a* inflow port
38*b* injection passage

The invention claimed is:

1. A turbine generator system comprising:

a turbine power generation unit including a generator and a turbine configured to drive the generator;

a working medium including a lubricant, the working medium causing the turbine power generation unit to operate;

an evaporator configured to evaporate the working medium by heat exchange with a heat source and to supply the evaporated working medium to the turbine power generation unit;

a condenser configured to liquefy the working medium that has flowed through the turbine power generation unit;

a medium feeding pump configured to raise a pressure of the liquefied working medium and to feed the working medium to the evaporator;

a circulating pump configured to take out the working medium from a lower portion of the evaporator and to inject the working medium into an inside of the evaporator through an injection port provided at an upper portion of the evaporator; and a feeding passage branched at an outlet of the circulating pump and configured to supply the working medium in a liquid phase extracted from the evaporator to a constituent in the turbine power generation unit, the constituent being lubricated by the working medium.

2. The turbine generator system according to claim 1, further comprising:

a return passage through which the working medium discharged from the constituent is returned to the condenser.

3. The turbine generator system according to claim 1, further comprising:

a depressurizing device provided on the feeding passage, the depressurizing device being configured to evaporate a part of the working medium by depressurization.

4. The turbine generator system according to claim 1, further comprising:

a cooler provided on the feeding passage and configured to cool the working medium.

5. The turbine generator system according to claim 1, wherein a bottom surface of the evaporator is disposed above an inlet through which the working medium is fed to the constituent.

6. The turbine generator system according to claim 1, wherein the lubricant has compatibility with a main medium.

7. The turbine generator system according to claim 1, wherein the working medium is a mixture of HFE (hydrofluoroether) and a lubricant composed of fluorinated oil.

8. The turbine generator system according to claim 1, wherein the constituent is a bearing in the turbine power generation unit, the turbine generator system further comprising:

an oil container configured to reserve a portion of the supplied working medium in the liquid phase, a lower portion of the bearing being immersed in the portion of the working medium reserved in the oil container.

9. The turbine generator system according to claim 1, wherein the constituent is a bearing in the turbine power generation unit, the turbine generator system further comprising:

an injection unit configured to inject the supplied working medium in the liquid phase to the bearing.

* * * * *